United States Patent
Chu et al.

(10) Patent No.: US 10,761,392 B2
(45) Date of Patent: Sep. 1, 2020

(54) POLARISATION-INDEPENDENT, OPTICAL MULTIPLEXING AND DEMULTIPLEXING SYSTEMS BASED ON FERROELECTRIC LIQUID CRYSTAL PHASE MODULATORS FOR SPATIAL MODE DIVISION MULTIPLEXING AND DEMULTIPLEXING

(71) Applicant: Cambridge Enterprise Limited, Cambridge (GB)

(72) Inventors: Daping Chu, Cambridge (GB); Haining Yang, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 274 days.

(21) Appl. No.: 15/537,485

(22) PCT Filed: Dec. 16, 2015

(86) PCT No.: PCT/GB2015/054043
§ 371 (c)(1),
(2) Date: Jun. 19, 2017

(87) PCT Pub. No.: WO2016/097733
PCT Pub. Date: Jun. 23, 2016

(65) Prior Publication Data
US 2017/0371217 A1    Dec. 28, 2017

(30) Foreign Application Priority Data
Dec. 19, 2014   (GB) .................................. 1422732.6

(51) Int. Cl.
*G02F 1/141*   (2006.01)

(52) U.S. Cl.
CPC .......... *G02F 1/141* (2013.01); *G02F 2203/06* (2013.01); *G02F 2203/12* (2013.01)

(58) Field of Classification Search
CPC ... G02F 2203/06; G02F 2203/12; G02F 1/141
(Continued)

(56) References Cited

U.S. PATENT DOCUMENTS

| 5,930,012 A * | 7/1999 | Mears ................... G02B 5/203 |
| | | 349/201 |
| 2006/0038809 A1* | 2/2006 | Kuo ..................... H04N 9/3111 |
| | | 345/211 |

(Continued)

FOREIGN PATENT DOCUMENTS

| EP | 2645609 A1 | 10/2013 |
| WO | 9610776 | 4/1996 |
| WO | 2005019380 A1 | 3/2005 |

OTHER PUBLICATIONS

Stepniak, et al., "Increasing Multimode Fiber Transmission Capacity by Mode Selective Spatial Light Phase Modulation", "36th European Conference and Exhbition on Optical Communication", Sep. 19, 2010, pp. 1-3, Publisher: IEEE, Published in: EP.

(Continued)

*Primary Examiner* — Nathanael R Briggs
*Assistant Examiner* — William D Peterson
(74) *Attorney, Agent, or Firm* — Loginov & Associates, PLLC; William A. Loginov

(57) ABSTRACT

We describe a multimode reconfigurable optical spatial mode multiplexing system having first and second first and second input beams and a beam combiner to combine these into an optical output. At least one of the paths comprises a polarisation-independent reconfigurable phase modulator to impose a controllable phase profile on an input beam in an input beam phase modulating optical path, to controllably convert a spatial mode order of the input beam from a lower to a higher order spatial mode. The system also has a control input to control the phase modulator to configure the phase profile for the mode conversion. The input beams are (Continued)

combined into a multiple spatial mode combined beam output independent of a polarisation of the input beams. The number of spatial modes of the combined beam can be more than a number of spatial modes in either of the first and second input beams separately.

10 Claims, 7 Drawing Sheets

(58) Field of Classification Search
USPC .......................................................... 349/33
See application file for complete search history.

(56) References Cited

U.S. PATENT DOCUMENTS

2013/0315532 A1    11/2013  Xie et al.
2015/0043910 A1*    2/2015  Koebele ................. H04J 14/04
                                                                    398/44

OTHER PUBLICATIONS

Warr, et al., "Polarisation Insensitive Diffractive FLC Systems", "Ferroelectrics", 1996, pp. 53-29, vol. 181, Publisher: Overseas Publishers Association, Published in: NL.

Koebele, et al., "Two Mode Transmission at 2x100Gb/s, Over 40KM-Long Prototype Few-Mode Filber, Using LCOS-Based Programmable Mode Multiplexer and Demultiplexer", "Optics Express", Aug. 15, 2011, pp. 16593-16600, vol. 19, No. 17, Publisher: OSA, Published in: US.

Warr et al., "Polarisation Insensitive Operation of Ferroelectric Liquid Crystal Devices", Electronics Letters, Apr. 27, 1995, vol. 31, No. 9, pp. 714-716.

Ryf et al., "Mode-Division Multiplexing Over 96 km of Few-Mode Fiber Using Coherent 6x6 MIMO Processing", Journal of Lightwave Technology, vol. 30, No. 4, Feb. 15, 2012, pp. 521-531.

Carpenter et al., "Holographic Mode Generation for Mode Division Multiplesing", OFC/NFOEC Technical Digest 2012 OSA, Electrical Engineering Division, Jan. 23, 2012, 3 pages.

* cited by examiner

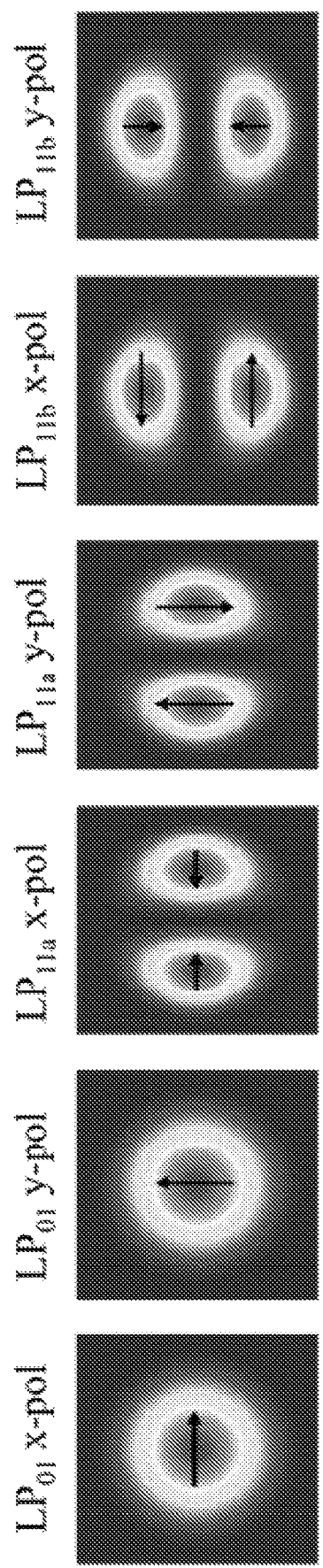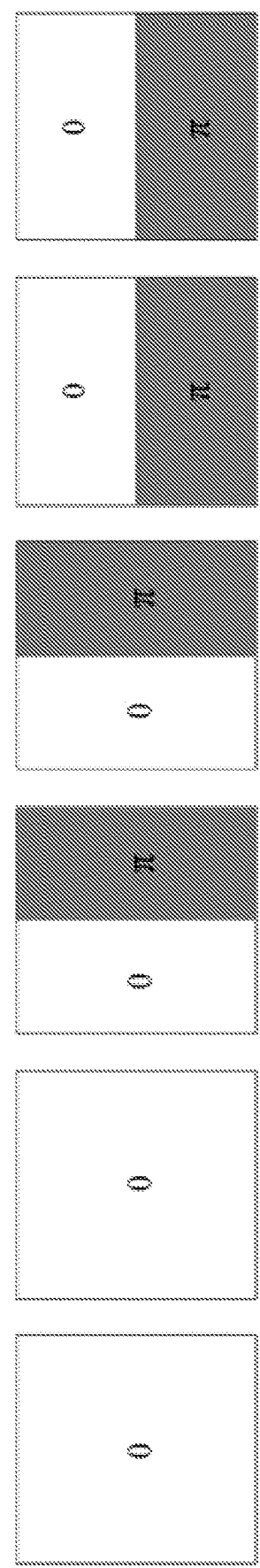
Figure 1
Figure 2

POLARISATION-INDEPENDENT, OPTICAL MULTIPLEXING AND DEMULTIPLEXING SYSTEMS BASED ON FERROELECTRIC LIQUID CRYSTAL PHASE MODULATORS FOR SPATIAL MODE DIVISION MULTIPLEXING AND DEMULTIPLEXING

FIELD OF INVENTION

This invention relates to methods and apparatus for reconfigurable optical spatial mode multiplexing/demultiplexing.

BACKGROUND TO THE INVENTION

There are numerous advantages to using single mode fibres in optical communication systems, but as the global demand for bandwidth increases new ways to encode data are sought. Thus amplitude, phase, wavelength and polarisation are currently employed for data encoding and, despite the advantages of single mode fibre, potentially optical spatial mode division multiplexing using multimode fibre provides a potential further method of increasing the data capacity in future telecommunication systems.

In a single mode fibre (SMF) communication system only light of the fundamental linear polarised (LP) mode, that is the $LP_{01}$ mode is able to propagate, broadly speaking because the fibre has a small core diameter. Multimode fibre (MMF) has a larger core diameter and multiple light beams of different cross-sectional spatial profiles or modes can propagate simultaneously and the different modes may be employed for different communications channels to provide mode division multiplexing. More particularly, multimode fibre enables optical signals to propagate at higher order LP modes and, especially in combination with wavelength division multiplexing (WDM) and optionally the use of dual-polarisation modulation, this can significantly increase the capacity of the optical telecommunications.

The use of static (non-reconfigurable) optical mode division multiplexing has previously been described in R. Ryf, et al., "*Mode-Division Multiplexing Over 96 km of Few-Mode Fiber Using Coherent 6×6 MIMO Processing*" J. Light. Technol. 30, 521-531 (2012). However this paper describes a lab-based proof of principle for mode division multiplexing and is not concerned with the solution of practical "in the field" problems. The University of Cambridge (where the inventors are located) has described techniques for mode division multiplexing using a computerised hologram, for example in "*Holographic mode generation for mode division multiplexing*", Joel Carpenter and Tim Wilkinson, Poster Session 1 (JW2A), Optical Fiber Communication Conference, Los Angeles, Mar. 4-8, 2012, ISBN: 978-1-55752-938-1. However this is technique relatively complex and bulky and improvements are desirable. General background prior art relating to ferroelectric liquid crystal devices can be found in S. T. Warr and R. J. Mears, "*Polarisation insensitive operation of ferroelectric liquid crystal devices*", Electron. Lett. 31, 714-716 (1995); and S. T. Warr and R. J. Mears, "*Polarisation insensitive diffractive FLC systems*", Ferroelectrics 181, 53-59 (1996).

SUMMARY OF THE INVENTION

According to a first aspect of the invention there is therefore provided a multimode reconfigurable optical spatial mode multiplexing system, the system comprising: a first optical path from to carry a first input beam a first optical input; a second optical path to carry a second input beam from a second optical input; a beam combiner to combine beams from said first and second optical paths and to provide a combined beam optical output; wherein at least one of said first and second optical paths is a phase modulating optical path and comprises a polarisation-independent reconfigurable phase modulator to impose a controllable phase profile on an input beam in the phase modulating optical path to controllably convert a spatial mode order of the input beam from a lower order spatial mode to a higher order spatial mode; and further comprising a control input to control said polarisation-independent reconfigurable phase modulator to configure said controllable phase profile to alter said conversion of said spatial mode order of said input beam; wherein said first and second input beams are combined into a multiple spatial mode combined beam optical output independent of a polarisation of said first and second input beams; and wherein a number of spatial modes of said combined beam is controllable with said control input to increase a number of spatial modes in said combined beam to more than a number of spatial modes in either of said first and second input beams separately.

In a related aspect there is provided a reconfigurable optical spatial mode demultiplexing system, the system comprising: an optical input to receive a multimode optical input beam, comprising a plurality of different optical spatial modes; a beam splitter to split said input beam into at least first and second split beams; first and second optical outputs; first and second optical paths between said beam splitter and respective said first and second optical outputs; wherein at least one of said first and second optical paths is a phase modulating optical path and comprises a polarisation-independent reconfigurable phase modulator to impose a controllable phase profile on a split beam in the phase modulating optical path to controllably convert a spatial mode order of the split beam from a higher order spatial mode to a lower order spatial mode; and further comprising a control input to control said polarisation-independent reconfigurable phase modulator to configure said controllable phase profile to alter said conversion of said spatial mode order of said split beam.

In embodiments employing a polarisation-independent, controllably reconfigurable phase modulator enables efficient use of an available optical transmission system, and also facilitates controllable optical spatial mode dependent routing. Moreover this can be achieved with a compact optical design since there is no need to split different (orthogonal) polarisation components into separate beams—they can be processed together in a single beam (per mode).

In preferred embodiments the polarisation-independent reconfigurable phase modulator comprises a ferroelectric liquid crystal (FLC) spatial light modulator which, as the skilled person will appreciate, has a binary response and a fast switching time. In particular the ferroelectric liquid crystal spatial light modulator is configured so that the phase difference between binary on and binary off states is $\pi$ radians at a wavelength of operation of the device/system. Preferable, therefore, the ferroelectric liquid crystal has a switching angle of >80° or 85°, preferably substantially 90° (the optical axis of the FLC molecules rotates through about a 90° angle). This helps to achieve an operating efficiency which approaches unity (the proportion of light in the target output mode). For similar reasons it is preferable that, at an operating wavelength, $\lambda$, of the device, $\eta$ is >0.5, 0.75 or 0.9, preferably substantially 1.0, where $\eta$ is given by:

$$\sin^2 2\theta \sin^2 \frac{k\Delta nd}{2}$$

Here 2θ is the switching angle of the ferroelectric liquid crystal material, d is the thickness of the FLC material in the spatial light modulator (in a direction of light propagation through the SLM), Δn is the birefringence of the FLC material, and $$k = \frac{2\pi}{\lambda}.$$

The binary nature of FLC material makes it particularly suitable (though not essential) for use in the polarisation-independent reconfigurable phase modulator, in particular because in embodiments only 2 phase levels, 0 and π, are employed. It is also convenient that FLC SLMs are bistable, that is they can be switched by a pulse which need not be maintained after switching (not all FLC materials are bistable, but those with a large tilt angle are usually bistable).

The skilled person will appreciate that depending upon the optical arrangement either a transmissive or a reflective ferroelectric crystal SLM may be employed. A reflective FLC SLM may be an LCOS (liquid crystal on silicon) device; this facilitates driving where the device comprises many pixels. In embodiments, however, the FLC SLM may comprise a relatively low number of pixels, for example ≤16 or ≤8, in embodiments four pixels.

In embodiments linear polarised (LP) optical spatial modes are employed but this is not essential and alternatively circularly polarised spatial modes may be used. Where reference is made in this specification to LP modes the skilled person will appreciate that this does not necessarily imply that polarisation multiplexing is employed—the LP modes described herein may be polarised (linearly) or unpolarised: mere reference to an LP mode does not imply that the mode is polarised, although it may be.

For the case of LP modes, these are typically described by a pair of integers l, m, where l is an azimuthal index and m is a radial index which ranges from 1 to some maximum value (which may decrease for increasing l). The lowest order LP mode, $LP_{01}$ (l=0; m=1) has a spatial cross section intensity profile which is similar to a Gaussian beam. In the context of LP modes conversion from a lower to a higher order mode is achieved when either or both of l and m increase (and vice versa for conversion from a higher to a lower order mode). The skilled person will recognise that the concept of lower and higher order modes applies equally to other types of transmission mode. For example in principle fibres with a high internal refractive index contrast between core and cladding may distinguish TE and TM modes; or the optical fibre may not be radially symmetric. Embodiments of the invention may be employed with such fibre types, although the spatial modes might then differ from the LP modes described later.

In one embodiment the phase modulator has 4 pixels tiling the active area of the modulator, one in each quadrant of the modulator. With such an arrangement an $LP_{01}$ mode may be converted into either of two orthogonal $LP_{11}$ modes, generally denoted $LP_{11a}$ and $LP_{11b}$, and vice versa (that is, from $LP_{11}$ to $LP_{01}$). To achieve this in this embodiment one half of the modulator is controlled to impose 0 (relative) phase shift and the other is controlled to impose π (relative) phase shift. Alternatively, for example, one pair of opposite quadrants along a diagonal maybe driven with 0 phase and the other diagonal pair with π phase to convert to $LP_{12}$.

In embodiments the reconfigurable phase modulator may be controlled to impose either a phase shift pattern on a beam or to impose no phase shift pattern on the beam, in effect to switch the spatial mode conversion on and off. This may be useful, for example, where it is desired to select which particular beam uses $LP_{01}$ (which has different propagation/noise characteristics to higher modes). This is also be useful in a system which may from time to time be under-utilised (needing to transmit less data), in particular where one or more beams may be switched off so that use of a higher order spatial mode is not required. The skilled person will appreciate that embodiments of the multiplexing/de-multiplexing/communications systems we describe may be used to multiplex/demultiplex and route 2, 3, 4 or more (in principle a large number) of input/output beams, each beam using a polarisation-independent, controllably reconfigurable phase modulator as described. Each of these phase modulators may have a separate controller/driver to control the modulator to impose the selected (optical spatial mode converting) phase profile and/or one controller/driver may be shared between one or more phase modulators. For example when a ferroelectric liquid crystal spatial light modulator is employed, because of the bistable nature of this device a single controller may be employed to control multiple devices sequentially because the FLC SLMs retain their programmed state after programming.

As the skilled person will appreciate in some preferred embodiments these techniques are employed in conjunction with one or both of wavelength division multiplexing and polarisation division multiplexing.

In a related aspect the invention provides an optical communication system comprising: a plurality of input optical fibres; a plurality of output optical fibres; an optical transmission system between said input optical fibres and said optical output fibres; an optical spatial mode multiplexing system coupled between said plurality of input optical fibres and said optical transmission system, to encode optical signals on said input optical fibres into a plurality of different optical spatial modes on a multiplexed multimode optical fibre; and an optical demultiplexing system coupled between said optical transmission system and said plurality of output optical fibres, to decode an optical spatial mode multiplexed signal on a multiplexed multimode optical fibre into a plurality of different optical spatial modes for said plurality of output optical fibres. In embodiments one or both of the multiplexing system and demultiplexing system uses one or more polarisation-independent phase modulators to implement mode division multiplexing/demultiplexing.

In embodiments the ability to control the spatial modes in the optical communication system enables transmission of an optical signal (in particular a spatial-mode multiplexed signal) to be optimised by selecting an optimal set of spatial modes for signals sent over the communications system. Additionally or alternatively the system may be employed to provide controllable optical mode-based routing, by controlling the spatial mode division multiplexing and/or demultiplexing of signals sent over the communication system. For example the spatial mode demultiplexing may be fixed in the sense that particular spatial modes are directed to particular optical fibres, in which case signals may be routed by selecting an optical spatial mode for a signal at the multiplexer (input) to the optical transmission system. Correspondingly if the input-side optical spatial mode division multiplexing is fixed signals may be selected and routed at the output demultiplexing side of the transmission system by using the demultiplexer to select particular optical spatial modes for delivery to particular output optical fibres. In addition, it will be appreciated that reconfigurable optical spatial mode multiplexing/demultiplexing may be employed at each end of the optical transmission system.

Further aspects of the invention provide corresponding methods.

Thus in a still further aspect the invention provides a method of multiplexing optical signals into a common optical fibre, the method comprising: providing a plurality of input optical signals on a plurality of input optical fibres; coupling said input optical fibres, via a respective plurality of optical paths, to a beam combiner and thence to a common output optical fibre; providing a plurality of polarisation-independent reconfigurable phase modulators, one in each of said optical paths; and controlling said reconfigurable phase modulators to impose respective phase profiles on said optical paths to convert said input optical signals into optical signals with a plurality of different optical spatial modes; combining said optical signals with said different optical spatial modes into a multiplexed multimode optical signal using said beam combiner; and outputting said multiplexed multimode optical signal into said common output optical fibre.

The invention also provides a method of demultiplexing a multimode optical signal comprising a plurality of different optical spatial modes, the method comprising: providing an input optical fibre carrying a multiplexed multimode optical signal comprising a plurality of different optical spatial modes multiplexed together; coupling said input optical fibre to a beam splitter and thence, via a plurality of optical paths, to a respective plurality of output optical fibres; providing a plurality of polarisation-independent reconfigurable phase modulators, one in each of said optical paths; and controlling said reconfigurable phase modulators to impose respective phase profiles on said optical paths to convert said multiplexed multimode optical signal into a plurality of separate demultiplexed optical signals, wherein different signals of said demultiplexed optical signals are derived from said different optical spatial modes of said multiplexed multimode optical signal; providing said demultiplexed optical signals to said output optical fibres; and outputting said demultiplexed optical signals.

BRIEF DESCRIPTION OF THE DRAWINGS

These and other aspects of the invention will now be further described, by way of example only, with reference to the accompanying figures in which:

FIG. 1 shows theoretical intensity profiles of LP (linear polarised) modes of a three-mode fibre;

FIG. 2 shows phase profiles corresponding to the intensity profiles of FIG. 1;

DETAILED DESCRIPTION AND PREFERRED EMBODIMENTS

Referring to FIGS. 1 and 2, these shows transverse intensity and phase profiles of different LP modes of an optical fibre. In FIG. 1 the arrows in the intensity profiles indicate that the primary direction of the field in each profile, which ultimately determines the polarisation direction of the mode. Typical telecommunication lasers generate an $LP_{01}$ mode beam and thus when mode division multiplexing is employed higher order LP modes, such as $LP_{11}$ modes, are excited from the $LP_{01}$ mode before being multiplexed into the MMF (multimode fibre). Conversion from a lower order to a higher order mode can be achieved by imposing a phase profile as shown in FIG. 2. The higher order mode can be observed in the far field beyond the phase mask, but can be brought nearer to the phase mask by employing a demagnifying optical system between the phase mask and the multimode fibre (diverging the light forming the higher LP mode).

Figure 3:
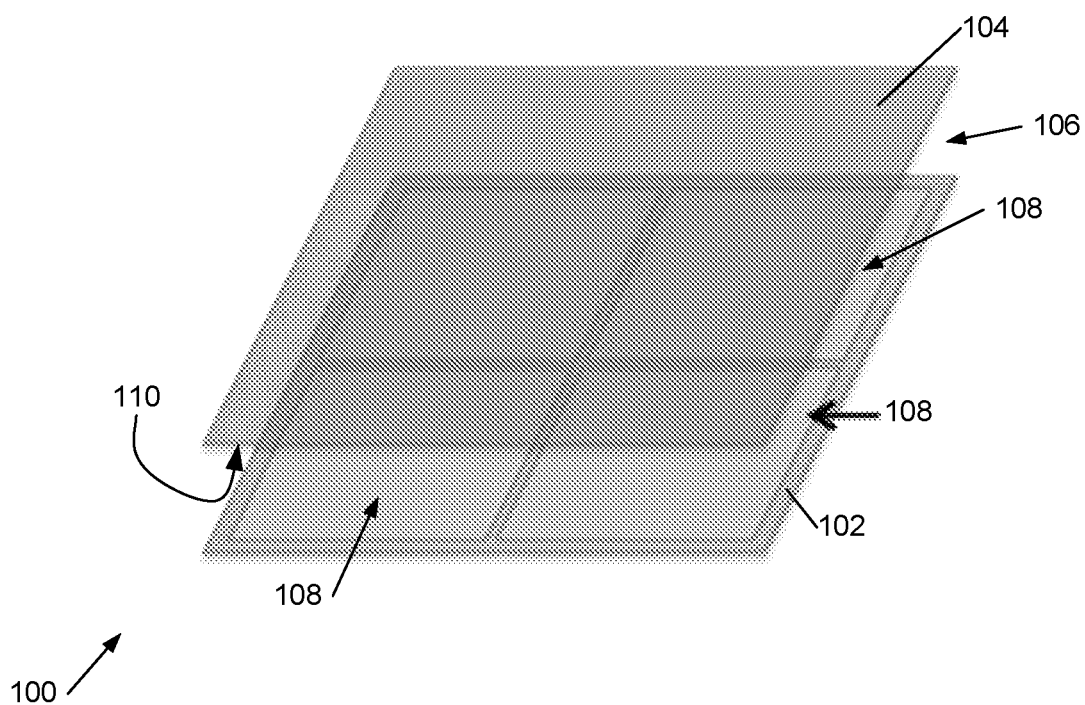
FIG. 3 shows a ferroelectric liquid crystal spatial light modulator for use in embodiments of the invention.

FIG. 3 shows an embodiment of a polarisation-independent, controllably reconfigurable phase modulator 100 for use in embodiments of the invention. In the illustrated example the phase modulator 100 is a transmissive device but reflective device configurations are also possible. The illustrated example comprises back glass 102 and front grass 104, sandwiching ferroelectric liquid crystal (FLC) material (not shown) in region 106 between these plates. One of the plates, for example front glass 104, is coated with an electrically conductive, light transmissive film such as ITO (indium tin oxide) to provide a common electrode connection 110. The other, here back glass 102, is provided with a plurality of light-transmissive, electrically conducting phase-pattern electrodes 108, for example also fabricated from ITO. In the illustrated example there are 4 substantially square phase-pattern electrodes 108, but fewer or more electrodes may be provided, or an operational region of the device may be divided into an array of pixels which may be employed to define a phase pattern. As is explained further below, the electrodes 108 are controlled so that different regions of the device define different relative phase values (retardations).

As explained further below, preferably the FLC material has a switching angle of substantially 90° between stable states of the FLC. A suitable FLC material is CS-2005 available from Chisso Corporation, Japan. The skilled person will appreciate, however, that there are many other FLC materials which have, or which can be designed to have, this property.

Figure 4:
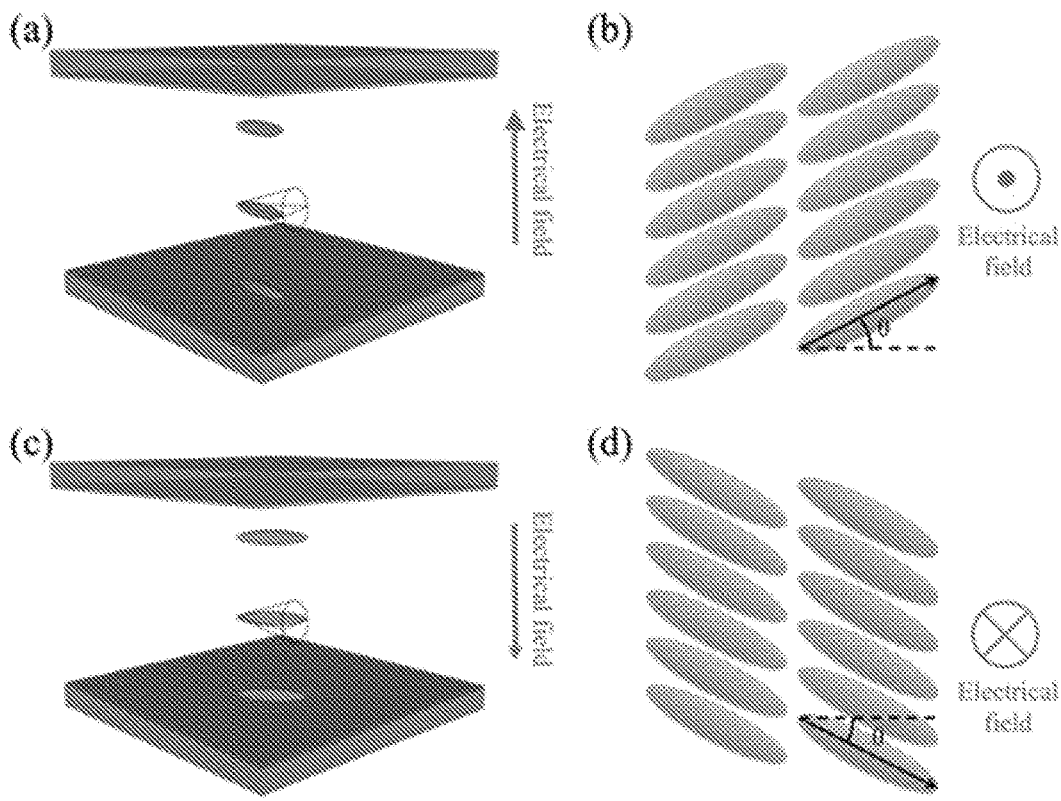
FIGS. 4a to 4d show ferroelectric liquid crystal (FLC) molecules in an FLC cell of the type illustrated in FIG. 3 showing, respectively, perspective and top views for positive and negative applied electric fields.

Preferably the thickness of the FLC material in the phase modulator of FIG. 3 (that is the internal distance between plates 102, 104) is chosen so that the phase difference between "on" and "off" states is substantially equal to 7l. This can be achieved by choosing $kd\Delta n=\pi$ where $k=2\pi/\lambda$, d is the thickness of the FLC material, and $\Delta n$ is the birefringence of the FLC material Referring to FIG. 4, this shows the orientation of FLC molecules in a phase modulator of the type shown in FIG. 3 when a positive electric field (FIGS. 4a, b) and a negative electric field (FIGS. 4c, d) is applied across the material by electrodes 108, 110. In the phase modulator the FLC material is aligned so that the birefringent axes of the material, $n_o$, $n_e$, lie in the plane of the device, the direction of light propagation perpendicular to the glass plates 102, 104 defining the z-direction. An applied voltage (electric field) causes these axes to rotate about the z-direction through a switching angle of $2\theta$, in embodiments 90°. The birefringence of the FLC material, $\Delta n = |n_o - n_e|$.

Ferroelectric liquid crystals (FLC) are polar materials. The local dipole density that couples to an external electric field lies perpendicular to the director of the molecule. Two states are possible for the FLC directors, for example when a FLC cell is in surface stabilised configuration. As shown in FIGS. 4a and 4c, the FLC molecules rotate along the cone surface into the opposite state if the direction of the external electrical field applied across the cell is reversed. It can be seen from the corresponding top view of the cell in FIGS. 4b and 4d that the optical axis of the FLC cell is also rotated in this case. The FLC material is aligned so that the birefringent axes of the material, $n_o$, $n_e$, lie in the plane of the device The electro-optical effect of an FLC cell can be analysed by using the Jones matrix of propagation through the device. In a case where the input beam has normal incidence to the FLC cell, the polarisation vectors ($E_1$ and $E_2$) of the beam in each state after passing through the FLC cell can be expressed by the following equations, respectively:

$$E_1 = \begin{bmatrix} e^{-jkd\Delta n}\cos2\theta & \sin2\theta \\ -e^{jkd\Delta n}\sin2\theta & \cos2\theta \end{bmatrix} E_{in} \qquad 1$$

$$E_2 = \begin{bmatrix} e^{jkd\Delta n}\cos2\theta & e^{jkd\Delta n}\sin2\theta \\ -\sin2\theta & \cos2\theta \end{bmatrix} E_{in} \qquad 2$$

where $E_{in}$ is the instantaneous 2-dimensional polarisation vector of the incident beam, $2\theta$ the switching angle of the FLC molecules, $\Delta n$ the birefringence, d the thickness of the FLC cell and k the wavenumber ($2\pi/\lambda$).

Figure 5:
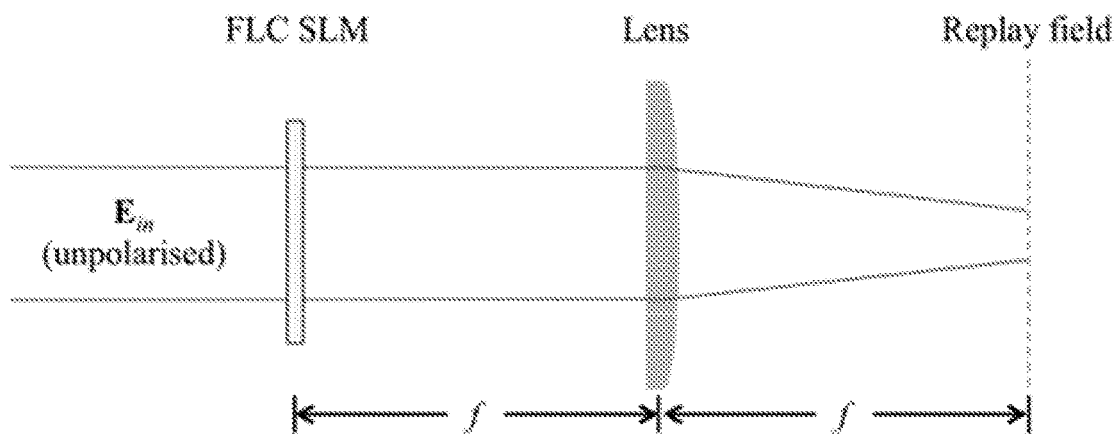
FIG. 5 illustrates spatial light modulation using an FLC spatial light modulator (SLM)

Referring now to FIG. 5, this shows use of a FLC cell with multiple electrodes as an SLM. If we assume that the phase patterns displayed by the FLC SLM in this system are designed such that there are always equal numbers of pixels in the two states (which is case for a "holographic" mode launch), the intensity of the light beam that is not diffracted by the FLC SLM can be analysed according to Fourier theory. The un-diffracted beam will form an on-axis spot in the replay field with intensity as $$I_o = \frac{1}{2}(E_1+E_2)\cdot\frac{1}{2}(E_1+E_2)^* \qquad 3$$

where $\cdot$ is the vector dot product and * is the conjugate operator.

Since the total beam intensity is $$I_{tot}=E_{in}\cdot E_{in}^* = (\frac{1}{2}E_1\cdot E_1^* + \frac{1}{2}E_2\cdot E_2^*) \qquad 4$$

the remaining fraction of light, $\eta$, diffracted into the desired replay pattern is given by:

$$\eta = \frac{I_{tot}-I_o}{I_{tot}} = \sin^2(2\theta)\sin^2\left(\frac{kd\Delta n}{2}\right) \qquad 5$$

This result is independent of the input polarisation state, and a FLC SLM device of the type shown in FIG. 3 can thus be used as a polarisation-independent, controllably reconfigurable phase modulator in a reconfigurable optical spatial mode multiplexer/demultiplexer as described later.

Preferably the device is configured so that the efficiency $\eta$ approaches unity. It can therefore be seen from equation (5) that, ideally, an FLC material with a switching angle of $2\theta=90°$, is employed (such as Chisso CS-2005), and that the FLC cell should have a half-wave plate thickness so that $kd\Delta n=\pi$. The phase difference in the holograms for mode launch is $\pi$, and thus an FLC SLM of the type shown in FIG. 3, configured as described above, is able to provide efficient, reconfigurable, polarisation-insensitive holographic mode launch.

Figure 6A:
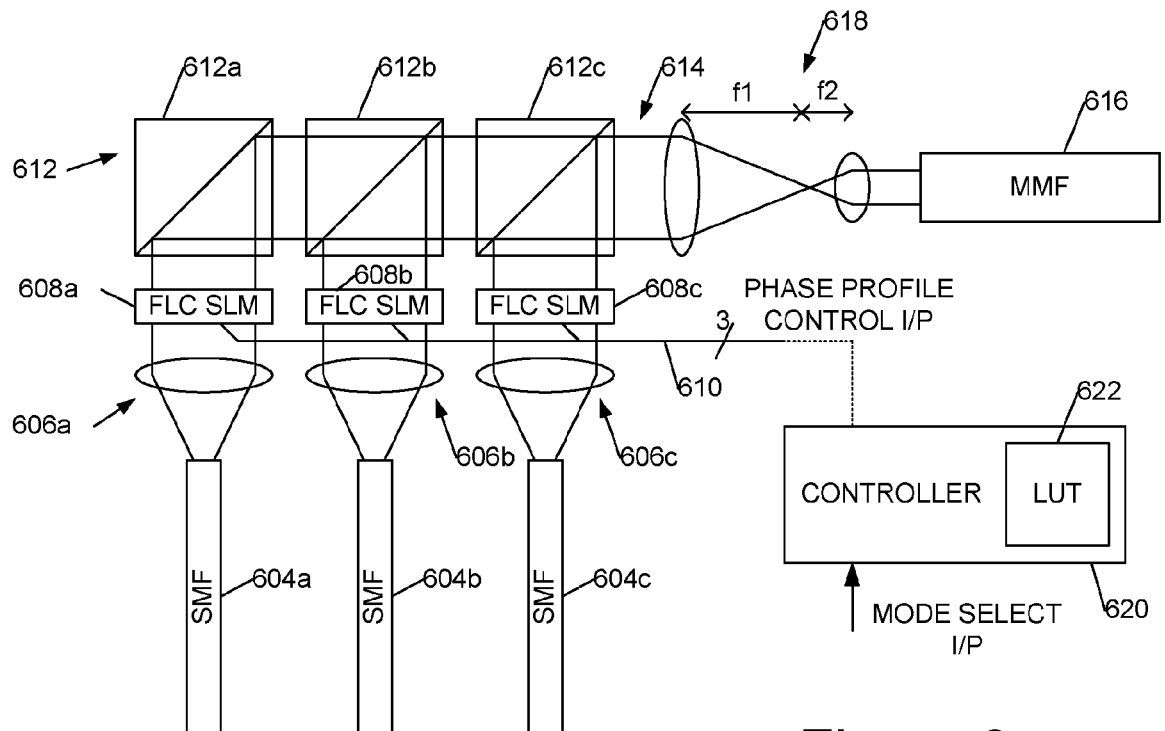
FIGS. 6a and 6b show multimode reconfigurable optical spatial mode multiplexing systems according to embodiments of the invention employing, respectively transmissive and reflective SLMs.

Referring now to FIG. 6a, this shows a multimode reconfigurable optical spatial mode multiplexing system 600 according to an embodiment of the invention. The system comprises a set of optical inputs 602a-c, each coupled to a respective single mode fibre 604a-c and having a beam expander lens 606a-c. Each expanded beam is provided to a respective polarisation-independent reconfigurable phase modulator 608a-c each, for example comprising a ferroelectric liquid crystal spatial light modulator as described above. These selectively convert the input beam, for example in a $LP_{01}$ mode, into a higher order spatial mode for example an $LP_{11a}$ or $LP_{11b}$ mode, under control of a respective phase profile control input 610. Thus, for example, the reconfigurable phase modulators may be controlled so as to leave one beam unchanged in an $LP_{01}$ mode and to convert each of the other beams to an $LP_{11a}$ and $LP_{11b}$ mode respectively. Which phase modulator performs which conversion, and which leaves the beam unchanged, is controllable by means of the signal on the phase profile control input 610. In embodiments the phase profile control input 610 for a phase modulator comprises a set of connections to each of electrodes 108 shown in FIG. 3.

The mode-converted beams are combined in an optical beam combiner 612, in the illustrated example comprising bean combiner blocks 612a-c. The combined output beam 614 is provided to an output optical fibre 616 which is a multimode fibre (MMF). In embodiments the output beam is coupled to the output fibre via demagnifying optics 618 preferably, but not essentially, configured as a demagnifying telescope.

The multiplexing system may include a controller 620 to drive the electrodes of the phase modulators with appropriate sets of (positive and negative) voltages to impose a phase profile for forming the mode conversion, for example phase profiles as shown in FIG. 2. Thus the controller may accept one or more mode select input signals and provide corresponding applied steady-state or pulsed voltage outputs to the respective phase modulators for the selected modes, optionally employing an internal lookup table 622. Since an FLC SLM is bistable optionally one controller may be employed to sequentially program each SLM.

The system of FIG. 6a has three phase modulators but the skilled person will appreciate that a degree of flexibility can be achieved with just a single reconfigurable phase modulator, depending upon whether/how the other inputs to the multiplexing system are employed. The skilled person will also appreciate that many variations on the beam combining arrangement are possible. The output fibre 616 is labelled as a multimode fibre but may be a "few mode fibre" that is a fibre supporting propagation of a limited number of (LP) guided modes. The number of guided modes supported generally depends on the normalized frequency, V, defined by $V=2\pi aNA/\lambda$ where a is the fibre core radius, NA is the numerical aperture, and $\lambda$ is the wavelength of operation. For example fibre 616 may be configured to support a number of modes equal to or less than 24, 18, 12, 6 or 3. The skilled person will also readily appreciate that although the example of FIG. 6*a* shows three input beams any number of input beams may be employed.

Figure 6B:
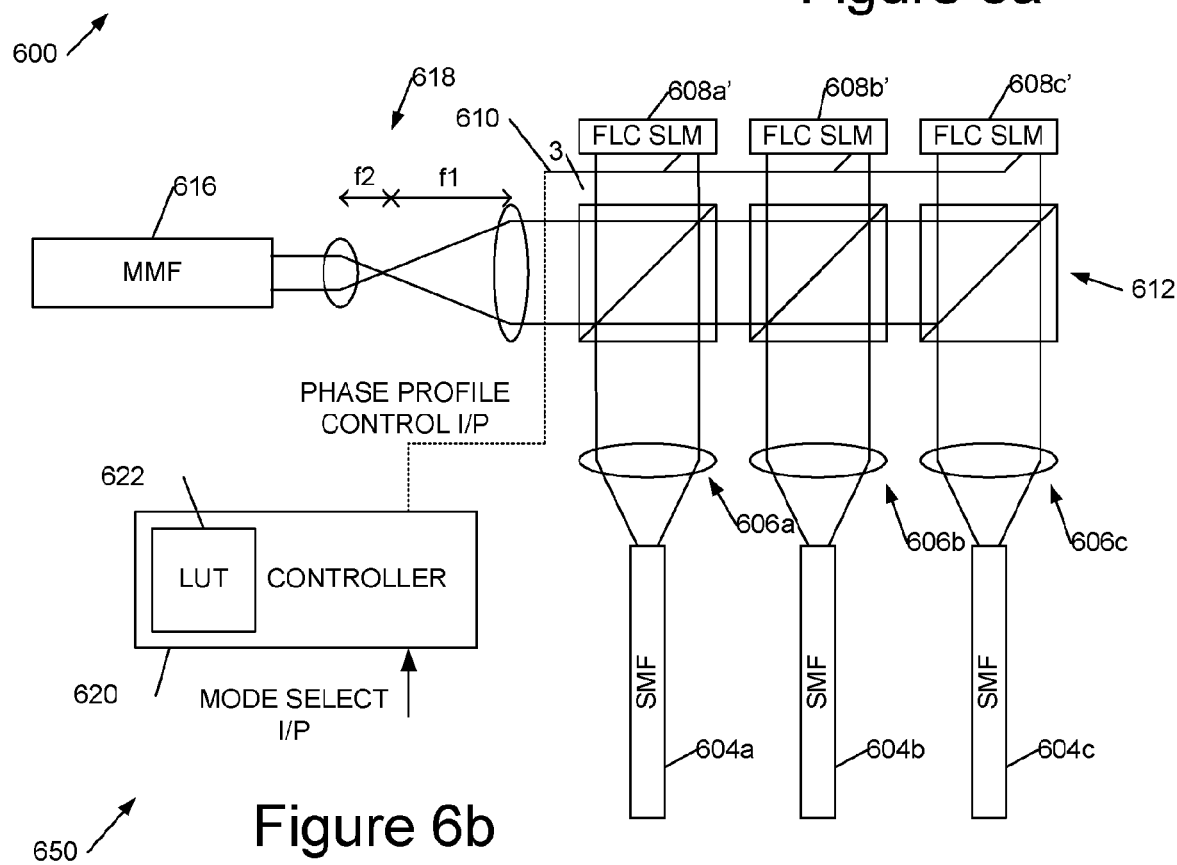

FIG. 6*b* shows a second embodiment of a multimode reconfigurable optical spatial mode multiplexing system 650, similar to that shown in FIG. 6*a*, in which like elements are indicated by like reference numerals. In the arrangement of FIG. 6*b* reflective ferroelectric liquid crystal SLMs 608*a-c'* are employed, rather than transmissive SLMs.

Figure 7A:
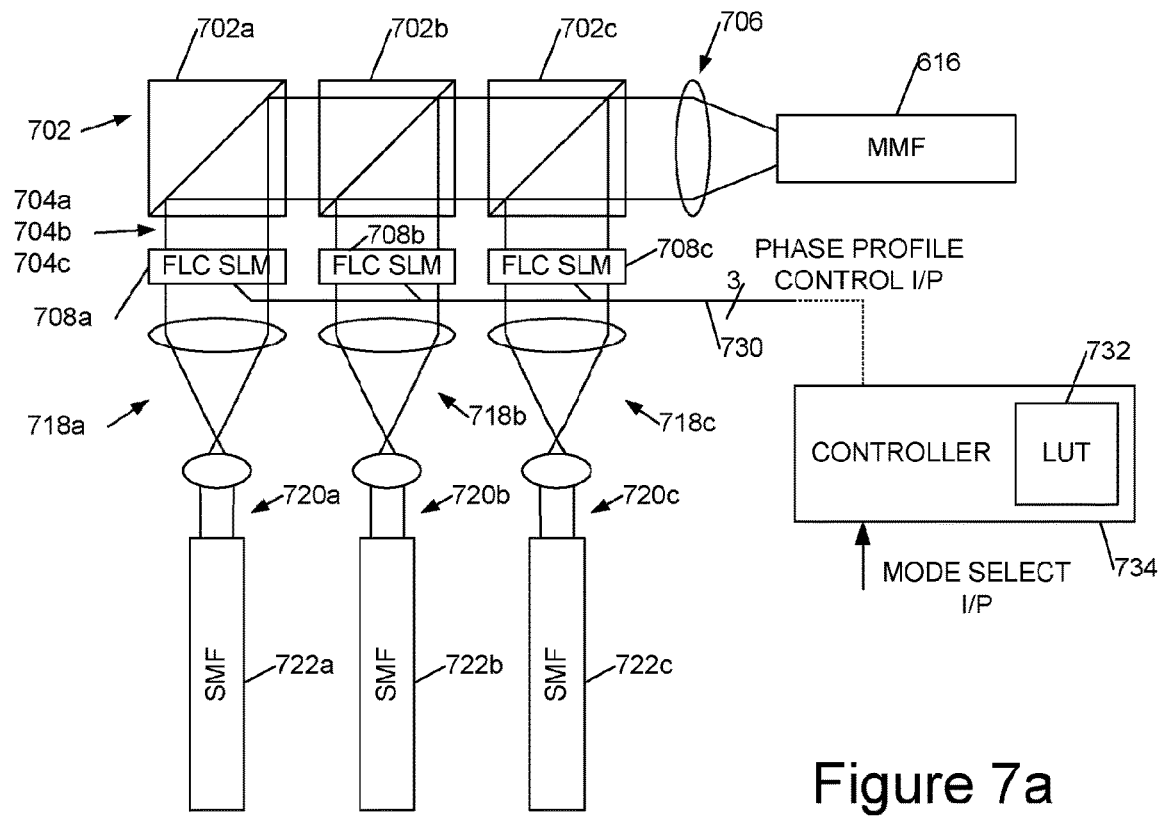
FIGS. 7a and 7b show that reconfigurable optical spatial mode demultiplexing systems according to embodiments of the invention employing, respectively, transmissive and reflective SLMs.

FIG. 7*a* shows an embodiment of a reconfigurable optical spatial mode demultiplexing system 700, again in which like elements to those of FIG. 6 are indicated by like reference numerals. Thus a multimode fibre 616 is provided to a beam expander 706 which provides an expanded beam to a beam splitter assembly 702 comprising a set of beam splitter blocks 702*a-c*. Split beams 704*a-c* are provided to respective polarisation—independent reconfigurable phase modulators 708 *a-c* for example each comprising a ferroelectric liquid crystal SLM of the type illustrated in FIG. 3. The skilled person will appreciate that in the demultiplexer the same phase patterns used for converting from a lower order spatial mode to a higher order spatial mode can be used for converting from a higher order spatial mode to a lower order spatial mode. Thus, for example, referring to FIG. 2 an $LP_{11}$ mode beam can be converted to an $LP_{01}$ beam by imposing a phase profile using the SLM in which one lateral half of the SLM imposes 0 relative phase delay and the other lateral half of the SLM imposes $\pi$ relative phase delay. Thus in this respect the demultiplexer is operates in a similar manner to the multiplexer, but with the light travelling in the opposite direction through the system. As before, preferably, but not essentially, light from each of the phase modulators is coupled into a respective optical output 720*a-c* by means of coupling optics 718*a-c* comprising demagnifying optics such as a demagnifying telescope. In embodiments single mode fibres 722*a-c* are coupled to the optical outputs 720*a-c*.

Again optical spatial mode demultiplexing into three channels is shown merely by way of illustration. Again multimode fibre 616 may be a "few mode fibre" as previously described. Again it is preferable, but not essential, to include a polarisation-independent reconfigurable phase modulator in each split beam. Again the skilled person will appreciate that there are many different techniques which may be employed to split the input beam for subsequent extraction of different optical spatial modes.

Figure 7B:
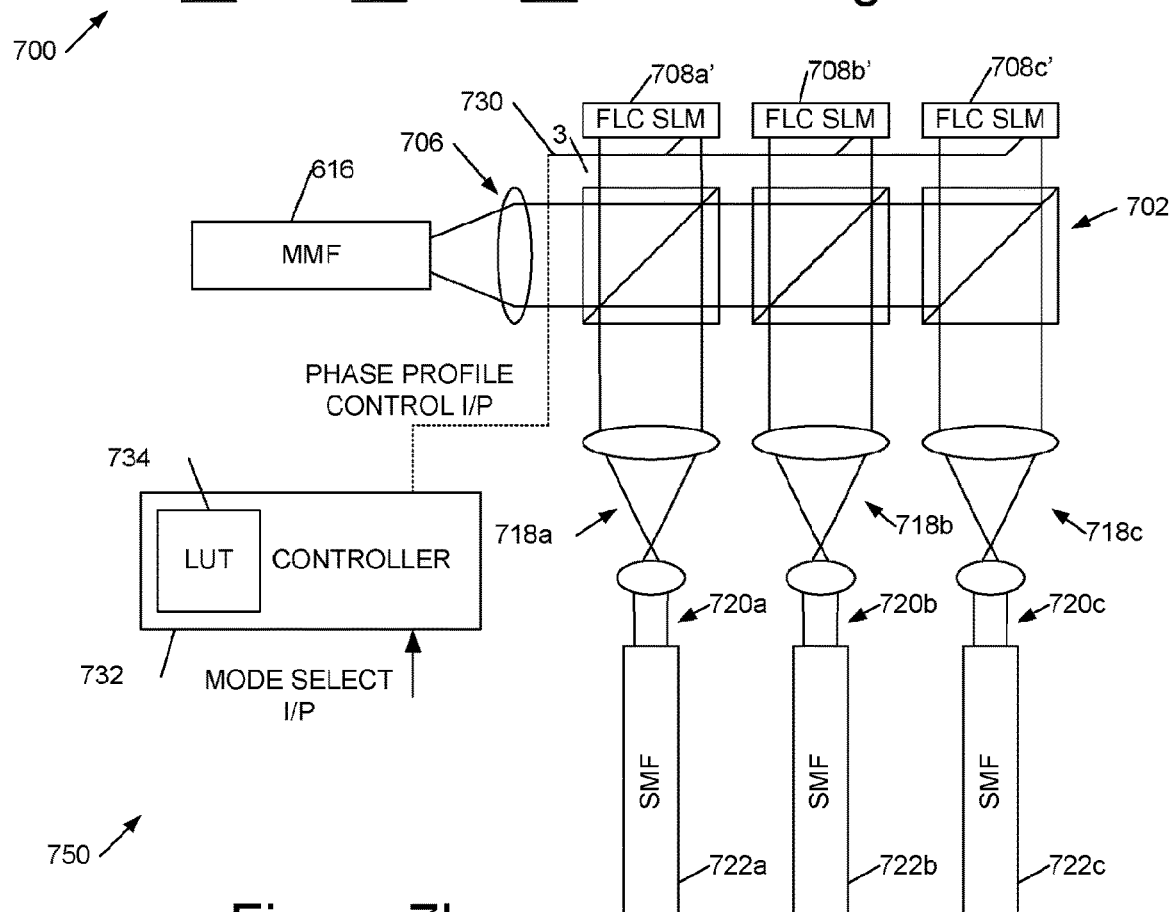

Referring now to FIG. 7*b*, this shows a second embodiment of a reconfigurable optical spatial mode demultiplexing system 750, in which like elements to those of FIG. 7*a* are indicated by like reference numerals. In FIG. 7*b* reflective ferroelectric liquid crystal SLM's 708*a-c'* are used instead of transmissive SLM's.

In each of the arrangements of FIGS. 7*a* and 7*b* a phase profile control input 730 is provided for the spatial light modulators as previously described. Optionally a controller 732 may also be provided, optionally including a lookup table 734, to convert an input optical mode selection signal (say 01_select, or 11_select) into appropriate drive voltages for the SLM pixels as previously described and illustrated for example in FIG. 2.

In one embodiment of a multiplexing/demultiplexing system as described above a ferroelectric liquid crystal SLM is used with four electrodes, as shown in FIG. 3. A device of this type is able to excite/multiplex, and demultiplex, five different LP modes: $LP_{01}$, $LP_{11a}$, $LP_{11b}$, $LP_{21a}$, and $LP_{21b}$. Furthermore with the configuration as described above the phase modulator is insensitive to polarisation, that is the device can modulate (or demodulate) the phase of the incoming beam without the need to separate a beam into two orthogonal polarisations (linear or circular): a single beam comprising two orthogonal polarisations can be processed by the same region of the same spatial light modulator to excite/multiplex and/or demultiplex an optical spatial mode.

Figure 8A:
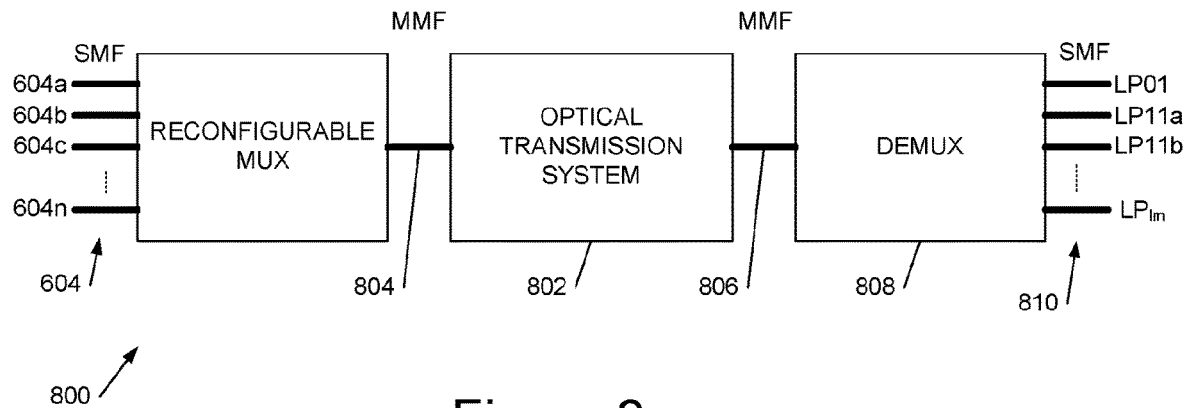
FIGS. 8a to 8c show optical communication systems employing spatial mode-based routing, according to embodiments of the invention.

Referring to FIG. 8, this shows examples of optical communications systems comprising a reconfigurable spatial mode multiplexer/demultiplexer as described above. Thus in FIG. 8*a* communications system 800 comprises an optical transmission system 802 with a multimode fibre input 804 and output 806 a reconfigurable multiplexer 600/650 as previously described is coupled to the input fibre 804 and a fixed assignment demultiplexer 808 is coupled to the output fibre 806. The fixed assignment demultiplexer assigns each spatial mode on fibre 806 to one of single mode fibre outputs 810, for example assigning mode $LP_{01}$ to a first output, $LP_{11a}$ to a second output, and so forth. In the arrangement of FIG. 8*a* the reconfigurable multiplexer 600/650 controls which of input fibres 604 has which spatial mode, and therefore to which output from the multiplexer 808 the input signal is routed. In this way by controlling reconfigurable multiplexer 600/650 the transmitter side of the system controls the signal destination.

Figure 8B:
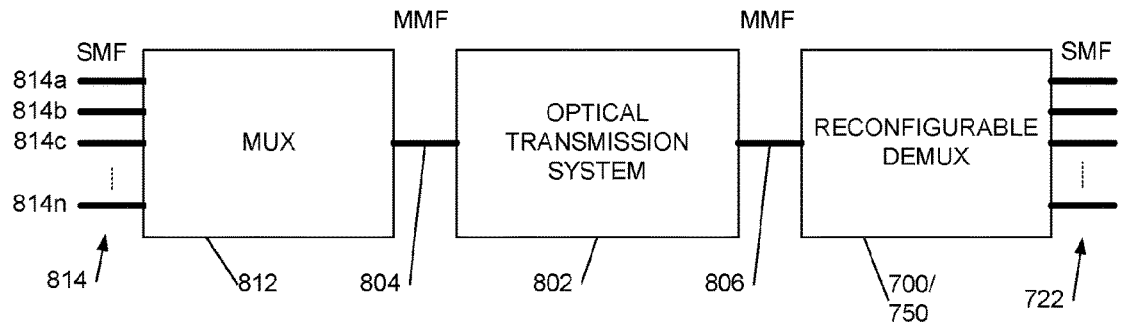

In FIG. 8*b* an optical communications system 810 comprises a fixed configuration multiplexer 812 is used at the input or transmitter end of the system and the encoding of each single mode fibre into a respective spatial mode is fixed at the transmitter side. A reconfigurable demultiplexer 700/750 as previously described is used on the output side of the optical transmission system to select which mode is routed to which output single mode fibre 722, thereby controlling routing of the optical signals at the output/receiver side.

Figure 8C:
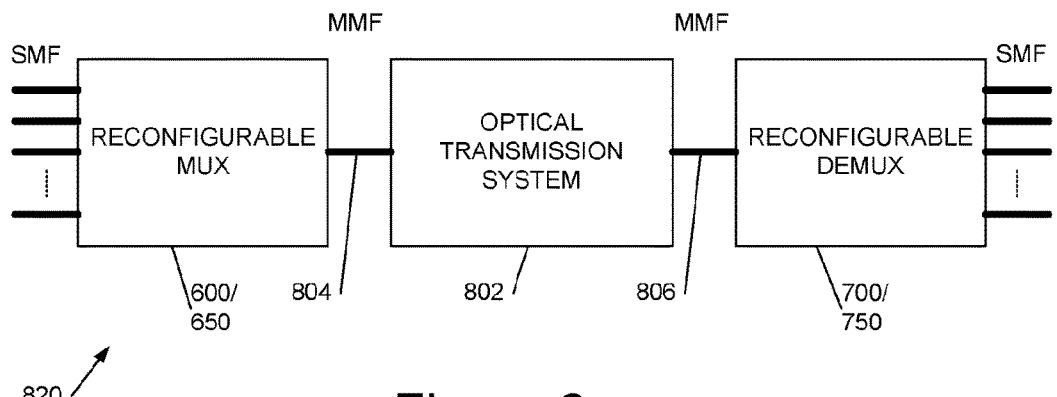

FIG. 8*c* shows an example of an optical communications system 820 comprising both a reconfigurable multiplexer 600/650 and a reconfigurable demultipexer 700/750, combining the previously described elements of FIGS. 8*a* and 8*b*.

The examples of FIG. 8 illustrate routing of signals based on their optical spatial mode. However a reconfigurable multiplexer 600/650 of the type described above can provide advantages even where routing by spatial mode is not employed. This is because different optical spatial modes have different transmission characteristics through a fibre, including different levels of noise and alike. The ability to reconfigurably select a spatial mode for a particular beam can assist a system administrator in selecting a set of spatial modes to use to optimise performance, especially where not all the available modes are employed at any one time.

Figure 9A:
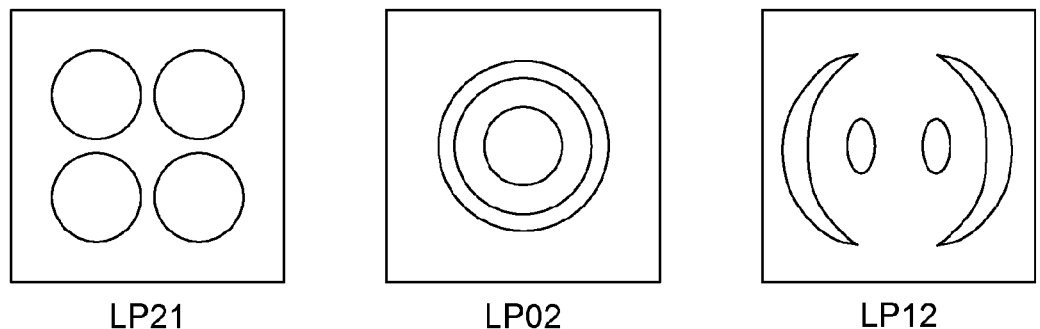
FIGS. 9a and 9b show, respectively, a schematic illustration of further examples of LP modes of a multimode fibre, and further example phase patterns for optical spatial mode conversion.

FIG. 9*a* illustrates intensity profiles for some further linear polarised spatial modes, merely by way of example. Thus FIG. 9*a* illustrates, schematically modes $LP_{21}$, $LP_{02}$, and $LP_{12}$, the subscripts denoting the azimuthal order and the radial order of the modes. As previously mentioned, for each LP mode with an azimuthal order greater than zero there are two orientations of the LP mode (not shown in FIG. 9*a*) rotated by 90° with respect to one another (with sin lθ and cos lθ azimuthal dependencies).

Figure 9B:
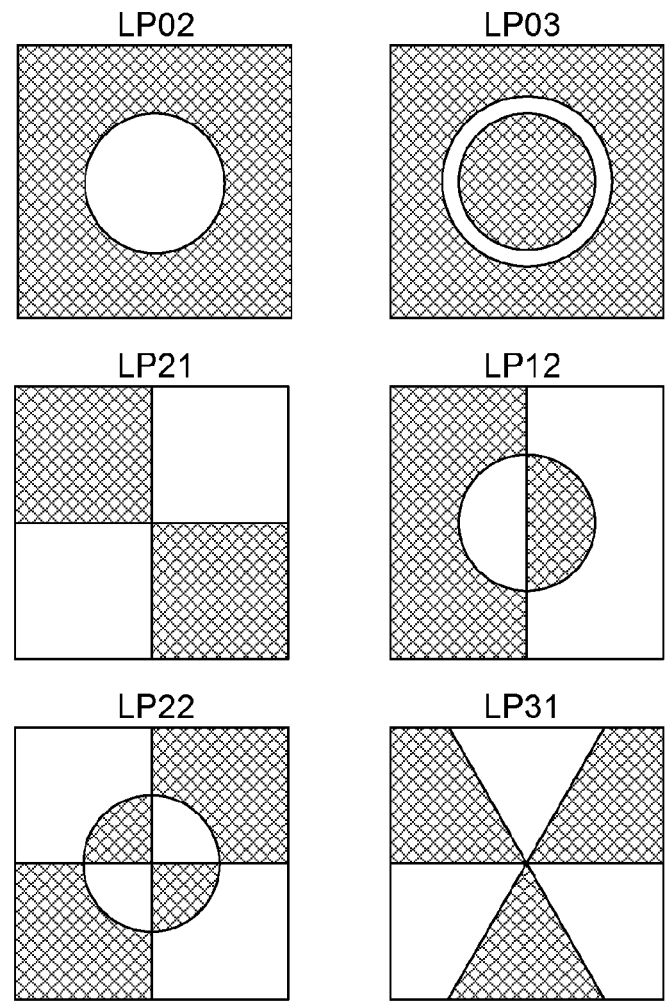

FIG. 9*b* illustrates, merely by way of example, some further phase profiles which may be imposed on an $LP_{01}$ mode beam to generate a higher order LP mode (as labelled in the figure). The skilled person will readily be able to generalise from the examples given to other higher order LP modes.

Embodiments of the reconfigurable mode division multiplexing/demultiplexing techniques we have described may be combined with other multiplexing/demultiplexing techniques such as polarisation division multiplexing and wavelength division multiplexing. Whether or not polarisation division multiplexing is employed embodiments of the described systems employ polarisation-independent (insensitive) reconfigurable phase modulators and thus can multiplex/demultiplex a beam comprising two polarisations or having a random polarisation without splitting the beam into separate polarisation components.

We have described some embodiments of multiplexing/demultiplexing systems which employ free space optical techniques but the skilled person will appreciate that integrated optics may additionally or alternatively be employed. We have described systems in which separate ferroelectric liquid crystal SLMs are employed in the separate beams but the skilled person will appreciate that, equally, different regions of a single ferroelectric liquid crystal SLM may be employed without materially changing the functionality. Although FIG. 3 shows an example of a transmissive SLM, a reflective SLM such as a ferroelectric LCOS (liquid crystal on silicon) SLM may be employed. This is particularly useful (for connecting to the electrodes) where the SLM has more than four pixels. Potentially the previously described beam combiner/beam splitter arrangements of FIGS. 6b and 7b could be fabricated as part of a cover plate on the SLM. This approach is particularly convenient when employing an LCOS SLM, but may also be employed with a transmissive SLM. Thus potentially the optical multiplexing and demultiplexing systems shown in FIGS. 6 and 7 could be fabricated as integrated optics devices with fibre inputs and/or outputs.

It will be understood that the invention is not limited to the described embodiments and encompasses modifications apparent to those skilled in the art line within the spirit and scope of the claims appended here too.

The invention claimed is:

1. A multimode reconfigurable optical spatial mode multiplexing system, the system comprising:
    a first optical path to carry a first input beam from a first optical input;
    a second optical path to carry a second input beam from a second optical input;
    a beam combiner to combine beams from said first and second optical paths and provide a combined beam optical output;
    wherein at least one of said first and second optical paths is a phase modulating optical path and comprises a polarisation-independent reconfigurable phase modulator to impose a controllable phase profile on an input beam in the phase modulating optical path to controllably convert a spatial mode order of the input beam from a lower order spatial mode to a higher order spatial mode; and
    further comprising a control input to control said polarisation-independent reconfigurable phase modulator to configure said controllable phase profile to alter said conversion of said spatial mode order of said input beam;
    wherein said first and second input beams are combined into a multiple spatial mode combined beam fibre optical output independent of a polarisation of said first and second input beams;
    wherein a number of spatial modes of said combined beam is controllable with said control input to increase a number of spatial modes in said combined beam to more than a number of spatial modes in either of said first and second input beams separately;
    wherein said polarisation-independent reconfigurable phase modulator comprises a ferroelectric liquid crystal (FLC) spatial light modulator (SLM); and
    wherein said ferroelectric liquid crystal (FLC) spatial light modulator (SLM) comprises exactly 4 pixels tiling an active area of the SLM, one in each quadrant of the modulator.

2. A system as claimed in claim 1 wherein said phase modulating optical path is arranged to carry a multiple polarisation beam, said multiple polarisation beam comprising two different polarisations; and
    wherein the same or overlapping regions of said polarisation-independent reconfigurable phase modulator receive and modulate said two different polarisations of said multiple polarisation of beam.

3. A system as claimed in claim 1 wherein FLC SLM said has a switching angle of greater than 80°.

4. A system as claimed in claim 1 wherein at an operating wavelength, λ, of the device $$\sin^2 2\theta \sin^2 \frac{k\Delta nd}{2}$$

is greater than 0.5, where in 2θ is the switching angle of the FLC material in the SLM in a direction of light propagation through the SLM, and $$k = \frac{2\pi}{\lambda}.$$

5. A system as claimed in any one of claim 1 wherein said optical output is couplable to a multimode optical fibre, wherein said pixels are responsive to said control input to configure said controllable phase profile, and wherein said phase profile is configurable to select one of a plurality of phase profiles each corresponding to a respective spatial LP mode of said multimode optical fibre.

6. A system as claimed in claim 5 further comprising a controller, responsive to a mode-select signal on said control input, to select one of said plurality of phase profiles and to control said FLC SLM to impose the selected phase profile on said beam in said phase modulating optical path such that at said optical output said beam has a spatial LP mode selected by said mode select signal.

7. A system as claimed in claim 1 wherein said controllable phase profile has four adjacent regions each switchable between a relative phase delay of 0 and a relative phase delay of π to convert an $LP_{01}$ spatial mode beam of any polarisation into an $LP_{11}$ beam of any polarisation.

8. A system as claimed in claim 1 wherein said controllable phase profile is configurable to alter said conversion of said spatial mode order of said input beam between no conversion of said spatial mode order from one spatial mode to another and conversion of said spatial mode order from a lower spatial mode to a higher spatial mode order in said combined beam spatial output.

9. A system as claimed in claim 1 further comprising a third optical path to carry a third input beam from a third optical input;

wherein each of said first, second and third optical paths comprises a respective said polarisation-independent reconfigurable phase modulator;

wherein said fibre optical output is arranged to couple to a fibre optic; and wherein the system further comprises demagnifying optics between said beam combiner and said fibre optical output.

10. An optical communication system comprising the system of claim 1, and a reconfigurable optical spatial mode demultiplexing system, the demultiplexing system comprising:

an optical input to receive a multimode optical input beam, comprising a plurality of different optical spatial modes;

a beam splitter to split said input beam into at least first and second split beams;

first and second optical outputs;

first and second optical paths between said beam splitter and respective said first and second optical outputs;

wherein at least one of said first and second optical paths is a phase modulating optical path and comprises a polarisation-independent reconfigurable phase modulator to impose a controllable phase profile on a split beam in the phase modulating optical path to controllably convert a spatial mode order of the split beam from a higher order spatial mode to a lower order spatial mode;

further comprising a control input to control said polarisation-independent reconfigurable phase modulator to configure said controllable phase profile to alter said conversion of said spatial mode order of said split beam;

wherein said polarisation-independent reconfigurable phase modulator comprises a ferroelectric liquid crystal (FLC) spatial light modulator (SLM); and wherein said ferroelectric liquid crystal (FLC) spatial light modulator (SLM) comprises exactly 4 pixels tiling an active area of the SLM, one in each quadrant of the modulator;

the optical communication system further comprising:

a plurality of input optical fibres;

a plurality of output optical fibres;

an optical transmission system between said input optical fibres and said optical output fibres;

an optical spatial mode multiplexing system coupled between said plurality of input optical fibres and said optical transmission system, to encode optical signals on said input optical fibres into a plurality of different optical spatial modes on a multiplexed multimode optical fibre; and an optical demultiplexing system coupled between said optical transmission system and said plurality of output optical fibres, to decode an optical spatial mode multiplexed signal on a multiplexed multimode optical fibre into a plurality of different optical spatial modes for said plurality of output optical fibres.

* * * * *